(12) United States Patent  (10) Patent No.: US 8,730,898 B2
Kim et al.  (45) Date of Patent: May 20, 2014

(54) METHOD AND APPARATUS FOR TRANSMITTING AN UPLINK CONTROL SIGNAL IN A WIRELESS COMMUNICATION SYSTEM

(75) Inventors: Min Gyu Kim, Anyang-si (KR); Suck Chel Yang, Anyang-si (KR); Joon Kui Ahn, Anyang-si (KR); Dong Youn Seo, Anyang-si (KR)

(73) Assignee: LG Electronics Inc., Seoul (KR)

( * ) Notice: Subject to any disclaimer, the term of this patent is extended or adjusted under 35 U.S.C. 154(b) by 104 days.

(21) Appl. No.: 13/500,823

(22) PCT Filed: Oct. 8, 2010

(86) PCT No.: PCT/KR2010/006886
§ 371 (c)(1),
(2), (4) Date: Apr. 6, 2012

(87) PCT Pub. No.: WO2011/043617
PCT Pub. Date: Apr. 14, 2011

(65) Prior Publication Data
US 2012/0201220 A1 Aug. 9, 2012

Related U.S. Application Data

(60) Provisional application No. 61/249,994, filed on Oct. 8, 2009.

(30) Foreign Application Priority Data

Oct. 8, 2010 (KR) .................. 10-2010-0098055

(51) Int. Cl.
*H04W 88/00* (2009.01)
(52) U.S. Cl.
USPC ........... 370/329; 375/295; 375/261; 370/208; 714/749; 455/422.1

(58) Field of Classification Search
USPC ............... 370/328–330, 280–281, 311, 252, 370/335–338; 714/751; 455/509, 552.1
See application file for complete search history.

(56) References Cited

U.S. PATENT DOCUMENTS 8,351,538 B2 * 1/2013 Nakao et al. .................. 375/295
2009/0042558 A1 2/2009 Shen et al.
(Continued)

FOREIGN PATENT DOCUMENTS

| KR | 10-2007-0119963 A | 12/2007 |
| KR | 10-2008-0035437 A | 4/2008 |
| WO | WO 2008/153350 A1 | 12/2008 |

OTHER PUBLICATIONS

Samsung, "Multiplexing CQI and ACK/NAK Transmission in E-UTRA UL," 3GPP TSG RAN WG1 #50bis, Agenda Item 6.2.4, R1-074097, Oct. 8-12, 2007, Shanghai, China, 4 pages.

(Continued)

*Primary Examiner* — Charles C Jiang
*Assistant Examiner* — Rose Clark
(74) *Attorney, Agent, or Firm* — Birch, Stewart, Kolasch & Birch, LLP

(57) ABSTRACT

A method and apparatus for transmitting an uplink control signal in a wireless communication system are provided. A user equipment spreads a third control signal by using either a reference signal sequence of a first control signal or a reference signal sequence of a second control signal, thereby multiplexing the third control signal to the first and second control signals. Thus, a payload of a control channel can be increased.

12 Claims, 16 Drawing Sheets

First slot :

Second slot :

(56) References Cited

U.S. PATENT DOCUMENTS

2010/0027409 A1    2/2010  Kwon et al.
2010/0075686 A1*   3/2010  Bhattad et al. ............... 455/450
2012/0127961 A1*   5/2012  Kawamura et al. ........... 370/335
2013/0223386 A1*   8/2013  Futagi et al. .................. 370/329

OTHER PUBLICATIONS

Texas Instruments, "Simultaneous CQI and ACK/NAK Transmission in Uplink," 3GPP TSG RAN WG1 #50, Agenda Item 7.2.4, R1-073431, Aug. 20-24, 2007, Athens, Greece, 4 pages.

* cited by examiner

US 8,730,898 B2

METHOD AND APPARATUS FOR TRANSMITTING AN UPLINK CONTROL SIGNAL IN A WIRELESS COMMUNICATION SYSTEM

This application is the National Phase of PCT/KR2010/006886 filed on Oct. 8, 2010, which claims priority under 35 U.S.C. 119(e) to U.S. Provisional Application No. 61/249,994 filed on Oct. 8, 2009, and under U.S.C. 119(a) to Patent Application No. 10-2010-0098055 filed in the Republic of Korea on Oct. 8, 2010, all of which are hereby expressly incorporated by reference into the present application.

TECHNICAL FIELD

The present invention relates to wireless communications, and more particularly, to a method and apparatus for transmitting an uplink control signal in a wireless communication system.

BACKGROUND ART

Long term evolution (LTE) based on $3^{rd}$ generation partnership project (3GPP) technical specification (TS) release 8 is a promising next-generation mobile communication standard.

As disclosed in 3GPP TS 36.211 V8.7.0 (2009-05) "Evolved Universal Terrestrial Radio Access (E-UTRA); Physical Channels and Modulation (Release 8)", a physical channel of the LTE can be classified into a downlink channel, i.e., a physical downlink shared channel (PDSCH) and a physical downlink control channel (PDCCH), and an uplink channel, i.e., a physical uplink shared channel (PUSCH) and a physical uplink control channel (PUCCH).

The PUCCH is distinguished by using different codes, frequencies, times, or combinations thereof while using the same time-frequency resources. Code division multiplexing (CDM) uses different codes. Frequency division multiplexing (FDM) uses different frequencies. That is, each of user equipments transmits its PUCCH by using different codes and/or frequencies in the same time resource.

It can be said that transmission reliability is more important than transmission capacity in a control channel. This is because when an error occurs in transmission of the control channel, a data channel may be never received or it may have a significant effect on scheduling or HARQ operations. Therefore, a payload of the control channel is generally limited to be less than several bits to tens of bits.

In addition, in the uplink control channel, a peak-to-average power ratio (PAPR)/cubic metric (CM) property is important for power management of a user equipment. The uplink control channel needs to maintain a low PAPR/CM property to ensure long battery standby-time and low battery consumption. For this, LTE uses a sequence having a low PAPR/CM property such as a Zadoff-Chu (ZC) sequence in the control channel.

However, the increase in transmission capacity of the control channel is essential due to the introduction of a new technique such as a multiple input multiple output (MIMO) technique, a multi-carrier technique, or the like.

Accordingly, there is a need for a method capable of increasing transmission capacity of a control channel while maintaining a low PAPR/CM property.

SUMMARY OF INVENTION

Technical Problem

The present invention provides a control channel structure capable of increasing transmission capacity while maintaining a low peak-to-average power ratio (PAPR)/cubic metric (CM) property by using a plurality of resources.

Technical Solution

A user equipment spreads a third control signal by using either a reference signal sequence of a first control signal or a reference signal sequence of a second control signal, thereby multiplexing the third control signal to the first and second control signals. Thus, a payload of a control channel can be increased.

According to one aspect of the present invention, a method of transmitting an uplink control signal in a wireless communication system is provided. The method includes: generating a plurality of first modulation symbols by modulating a first control signal; generating a plurality of first cyclically-shifted sequences by cyclically shifting a base sequence by cyclic shift values derived from a first resource index; generating a plurality of first spread sequences by spreading the plurality of first modulation symbols respectively to the plurality of first cyclically-shifted sequences; mapping the plurality of first spread sequences respectively to a plurality of first data orthogonal frequency division multiplexing (OFDM) symbols; generating a plurality of first reference signal (RS) sequences for an RS used to demodulate the first control signal on the basis of the first resource index; mapping the plurality of first RS sequences respectively to a plurality of first RS OFDM symbols; generating a plurality of second modulation symbols by modulating a second control signal; generating a plurality of second cyclically-shifted sequences by cyclically shifting a base sequence by cyclic shift values derived from a second resource index; generating a plurality of second spread sequences by spreading the plurality of second modulation symbols respectively to the plurality of second cyclically-shifted sequences; mapping the plurality of second spread sequences respectively to a plurality of second data OFDM symbols; generating a plurality of second RS sequences for an RS used to demodulate the second control signal on the basis of the second resource index; mapping the plurality of second RS sequences respectively to a plurality of second RS OFDM symbols; generating a plurality of third modulation symbols by modulating a third control signal; and transmitting the first, second, and third control signals in a first slot and a second slot. The first slot includes the plurality of first data OFDM symbols and the plurality of first RS OFDM symbols, and the second slot includes the plurality of second data OFDM symbols and the plurality of second RS OFDM symbols. The plurality of third modulation symbols are spread to at least one of the plurality of first RS sequences and to at least one of the plurality of second RS sequences.

In the aforementioned aspect of the present invention, the first slot and the second slot may use identical subcarriers.

In addition, the first slot and the second slot may use different subcarriers.

In addition, the plurality of third modulation symbols may be generated by modulating the third control signal.

In addition, the method may further include receiving information on the first resource index from a base station In addition, the second resource index may be defined from an offset of the first resource index.

In addition, the method may further include information on the second resource index from the base station.

According to another aspect of the present invention, there is provided a user equipment including: a radio frequency (RF) unit for transmitting and receiving a radio signal; and a processor coupled to the RF unit. The processor is configured for: generating a plurality of first modulation symbols by modulating a first control signal; generating a plurality of first cyclically-shifted sequences by cyclically shifting a base sequence by cyclic shift values derived from a first resource index; generating a plurality of first spread sequences by spreading the plurality of first modulation symbols respectively to the plurality of first cyclically-shifted sequences; mapping the plurality of first spread sequences respectively to a plurality of first data OFDM symbols; generating a plurality of first RS sequences for an RS used to demodulate the first control signal on the basis of the first resource index; mapping the plurality of first RS sequences respectively to a plurality of first RS OFDM symbols; generating a plurality of second modulation symbols by modulating a second control signal; generating a plurality of second cyclically-shifted sequences by cyclically shifting a base sequence by cyclic shift values derived from a second resource index; generating a plurality of second spread sequences by spreading the plurality of second modulation symbols respectively to the plurality of second cyclically-shifted sequences; mapping the plurality of second spread sequences respectively to a plurality of second data OFDM symbols; generating a plurality of second RS sequences for an RS used to demodulate the second control signal on the basis of the second resource index; mapping the plurality of second RS sequences respectively to a plurality of second RS OFDM symbols; and generating a plurality of third modulation symbols by modulating a third control signal. The plurality of third modulation symbols are spread to at least one of the plurality of first RS sequences and to at least one of the plurality of second RS sequences.

Advantageous Effects

According to the present invention, a payload of a channel can be increased without worsening a peak-to-average power ratio (PAPR)/cubic metric (CM) property of the channel.

MODE FOR INVENTION

Figure 1:
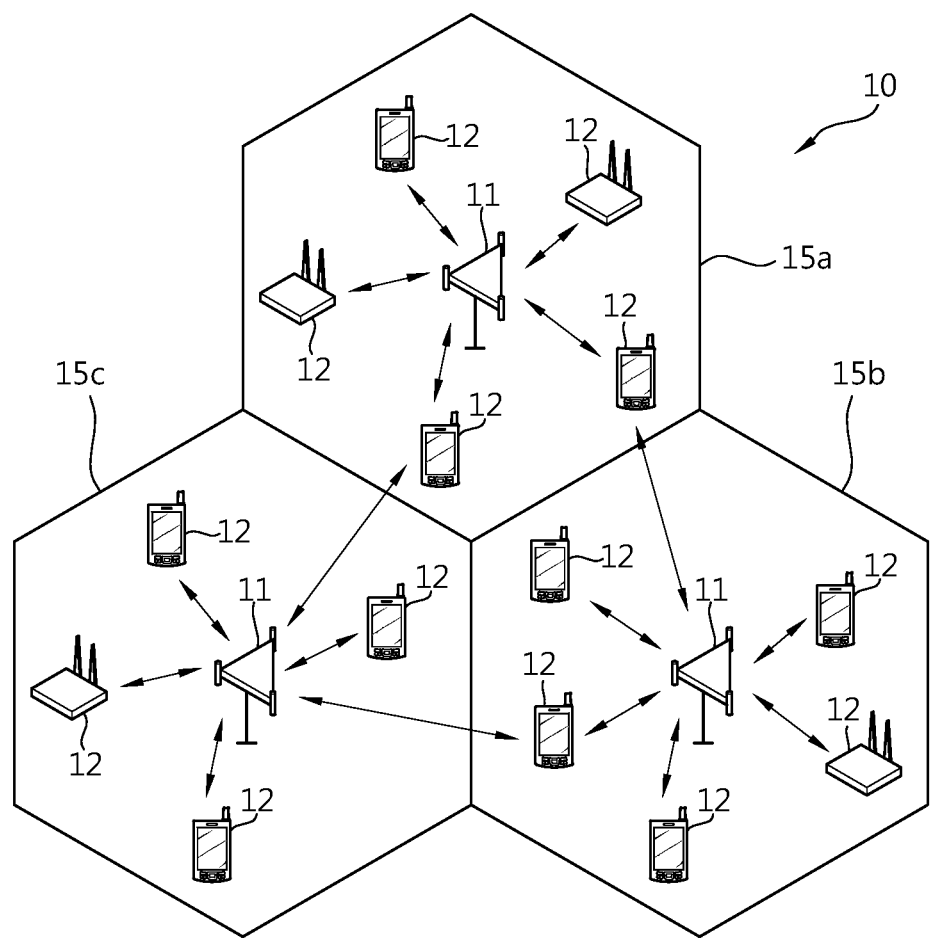
FIG. 1 shows a wireless communication system.

FIG. 1 shows a wireless communication system.
Referring to FIG. 1, a wireless communication system 10 includes at least one base station (BS) 11. The BSs 11 provide communication services to specific geographical regions (generally referred to as cells) 15a, 15b, and 15c. The cell can be divided into a plurality of regions (referred to as sectors).

A user equipment (UE) 12 may be fixed or mobile, and may be referred to as another terminology, such as a mobile station (MS), a mobile terminal (MT), a user terminal (UT), a subscriber station (SS), a wireless device, a personal digital assistant (PDA), a wireless modem, a handheld device, etc.

The BS 11 is generally a fixed station that communicates with the UE 12 and may be referred to as another terminology, such as an evolved node-B (eNB), a base transceiver system (BTS), an access point, etc.

Hereinafter, a downlink (DL) denotes a communication link from the BS to the UE, and an uplink (UL) denotes a communication link from the UE to the BS. In the DL, a transmitter may be a part of the BS, and a receiver may be a part of the UE. In the UL, the transmitter may be a part of the UE, and the receiver may be a part of the BS.

Figure 2:
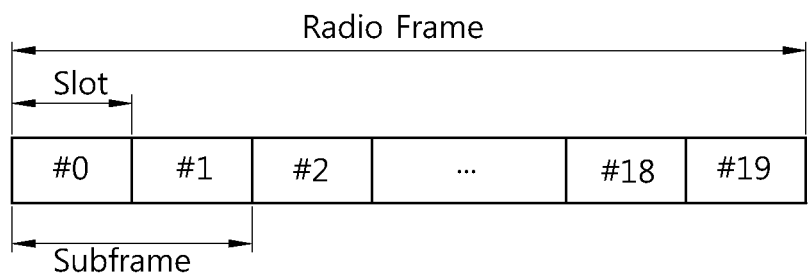
FIG. 2 shows a radio frame structure in $3^{rd}$ generation partnership project (3GPP) long term evolution (LTE).

FIG. 2 shows a radio frame structure in $3^{rd}$ generation partnership project (3GPP) long term evolution (LTE). The section 6 of 3GPP TS 36.211 V8.7.0 (2009-05) "Evolved Universal Terrestrial Radio Access (E-UTRA); Physical Channels and Modulation (Release 8)" may be incorporated herein by reference.

Referring to FIG. 2, a radio frame consists of 10 subframes. One subframe consists of 2 slots. One subframe may have a length of 1 millisecond (ms), and one slot may have a length of 0.5 ms. A time for transmitting one subframe is defined as a transmission time interval (TTI). The TTI may be a minimum unit of scheduling.

One slot may include a plurality of orthogonal frequency division multiplexing (OFDM) symbols in a time domain. The OFDM symbol is only for expressing one symbol period in the time domain, and there is no limitation in a multiple access scheme or terminologies. For example, the OFDM symbol may also be referred to as another terminology such as a single carrier frequency division multiple access (SC-FDMA) symbol, a symbol period, etc.

Although it is described herein that one slot includes 7 OFDM symbols, the number of OFDM symbols included in one slot may change depending on a cyclic prefix (CP) length. According to 3GPP TS 36.211 V8.7.0, in case of a normal CP, one slot includes 7 OFDM symbols, and in case of an extended CP, one slot includes 6 OFDM symbols.

The radio frame structure is for exemplary purposes only, and thus the number of subframes included in the radio frame and the number of slots included in the subframe may change variously.

Figure 3:
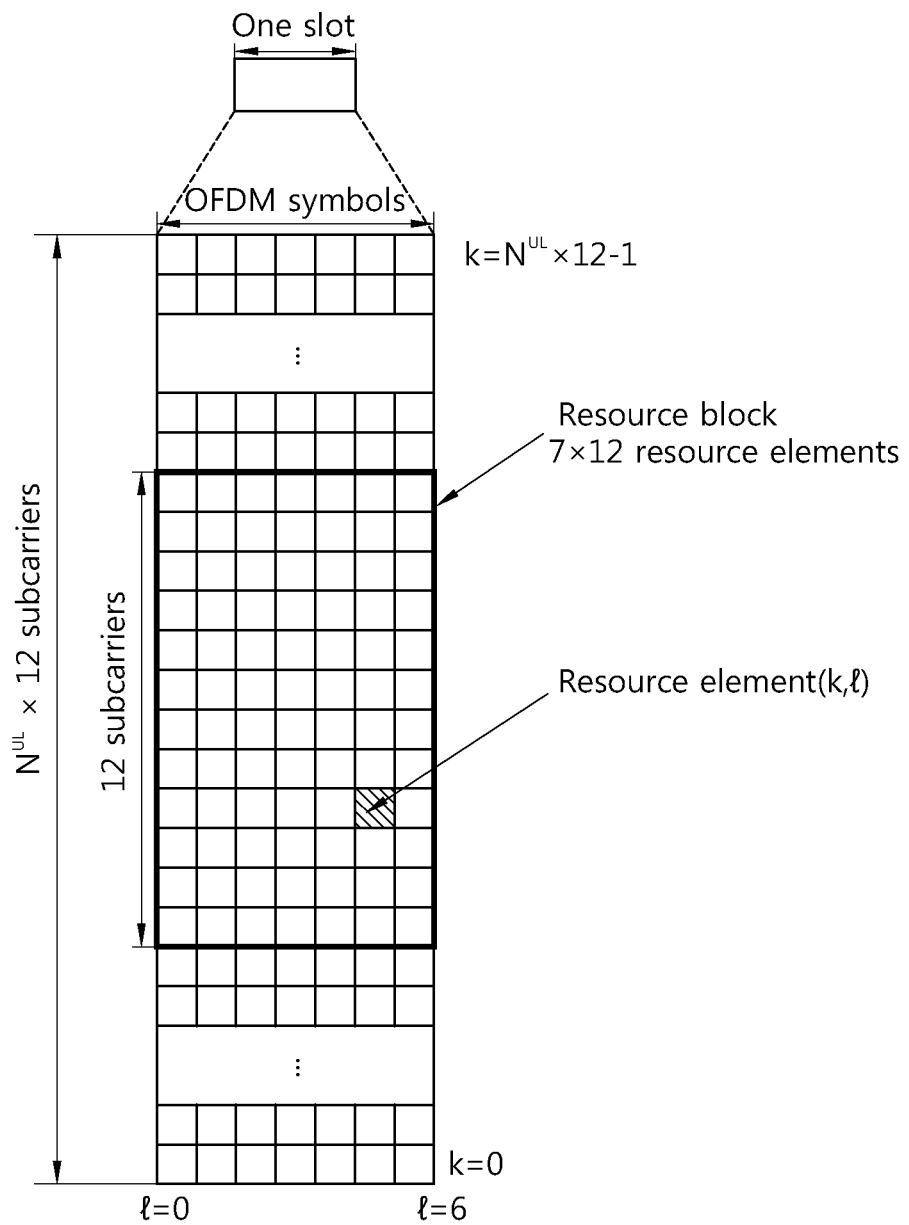
FIG. 3 shows an example of a resource grid for one slot.

FIG. 3 shows an example of a resource grid for one slot.

In a subframe, one slot includes a plurality of OFDM symbols in a time domain and a plurality of resource blocks (RBs) in a frequency domain.

The RB is a resource allocation unit, and includes a plurality of consecutive subcarriers in one slot.

For example, if one slot includes 7 OFDM symbols in the time domain and an RB includes 12 subcarriers in the frequency domain, one RB can include 7×12 resource elements (REs).

Figure 4:
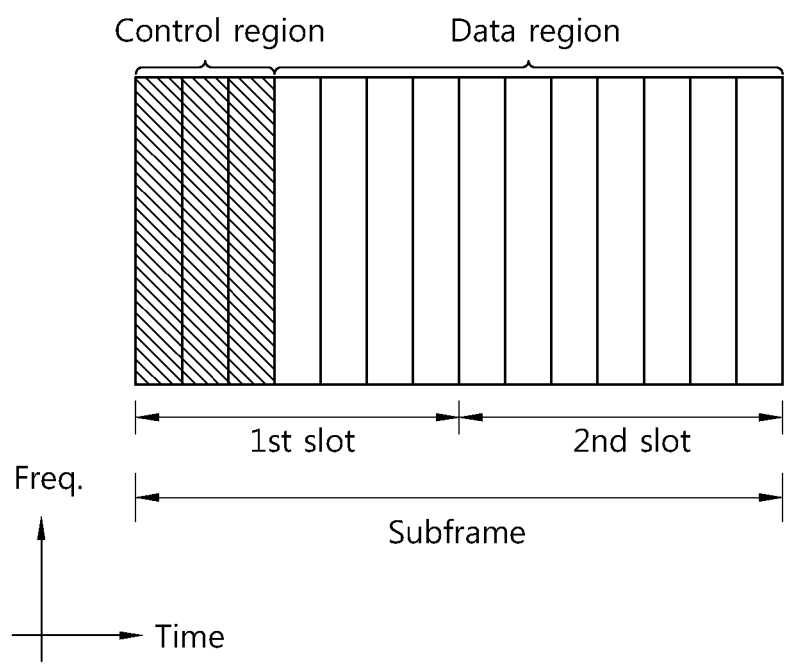
FIG. 4 shows a downlink subframe structure in 3GPP LTE.

FIG. 4 shows a DL subframe structure in 3GPP LTE.

Referring to FIG. 4, a DL subframe is divided into a control region and a data region in a time domain. The control region includes up to three preceding OFDM symbols of a $1^{st}$ slot in the subframe. The number of OFDM symbols included in the control region may vary. A physical downlink control channel (PDCCH) is allocated to the control region, and a physical downlink shared channel (PDSCH) is allocated to the data region.

As disclosed in 3GPP TS 36.211 V8.7.0, the 3GPP LTE can classify a physical channel into a data channel, i.e., a physical downlink shared channel (PDSCH) and a physical uplink shared channel (PUSCH), and a control channel, i.e., a physical downlink control channel (PDCCH), a physical control format indicator channel (PCFICH) and a physical hybrid-ARQ indicator channel (PHICH), and a physical uplink control channel (PUSCH).

The PCFICH transmitted in a $1^{st}$ OFDM symbol in the subframe carries a control format indicator (CFI) regarding the number of OFDM symbols (i.e., a size of the control region) used for transmission of control channels in the subframe. A UE first receives the CFI on the PCFICH, and thereafter monitors the PDCCH.

The PHICH carries a positive-acknowledgement (ACK)/negative-acknowledgement (NACK) signal for uplink hybrid automatic repeat request (HARQ). The ACK/NACK signal for UL data on the PUSCH transmitted by the UE is transmitted on the PHICH.

Control information transmitted on the PDCCH is referred to as downlink control information (DCI). The DCI may include resource allocation of the PDSCH (this is referred to as a DL grant), resource allocation of a PUSCH (this is referred to as a UL grant), a set of transmit power control commands for individual UEs in any UE group and/or activation of a voice over Internet protocol (VoIP).

The control region in the DL subframe includes a plurality of control channel elements (CCEs). The CCE is a logical allocation unit used to provide the PDCCH with a code rate depending on a wireless channel. The CCE corresponds to a plurality of resource element groups (REGs). According to a relation between the number of CCEs and the code rate provided by the CCEs, the PDCCH format and a possible number of bits of the PDCCH are determined.

Figure 5:
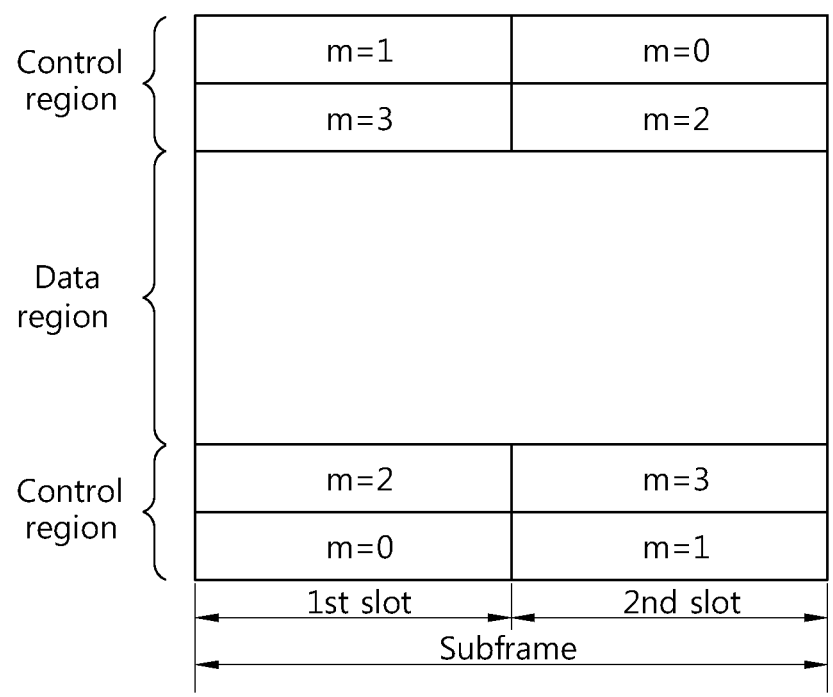
FIG. 5 shows an uplink subframe structure in 3GPP LTE.

FIG. 5 shows a UL subframe structure in 3GPP LTE.

Referring to FIG. 5, a UL subframe can be divided into a control region to which a physical uplink control channel (PUCCH) for carrying UL control information is allocated and a data region to which a physical uplink shared channel (PUSCH) for carrying UL data is allocated.

The PUCCH for one UE is allocated in an RB pair. RBs belonging to the RB pair occupy different subcarriers in each of a $1^{st}$ slot and a $2^{nd}$ slot. In FIG. 5, m is a location index indicating a logical frequency-domain location of the RB pair allocated to the PUCCH in the subframe. It shows that RBs having the same value m occupy different subcarriers in two slots.

According to 3GPP TS 36.211 V8.7.0, the PUCCH supports multiple formats. A PUCCH having a different number of bits per subframe can be used according to a modulation scheme depending on a PUCCH format.

Table 1 below shows an example of a modulation scheme and the number of bits per subframe with respect to the PUCCH format.

TABLE 1

| PUCCH Format | Modulation Scheme | Number of Bits per subframe |
|---|---|---|
| 1 | N/A | N/A |
| 1a | BPSK | 1 |
| 1b | QPSK | 2 |
| 2 | QPSK | 20 |
| 2a | QPSK + BPSK | 21 |
| 2b | QPSK + BPSK | 22 |

The PUCCH format 1 is used for transmission of a scheduling request (SR). The PUCCH formats 1a/1b are used for transmission of an ACK/NACK signal. The PUCCH format 2 is used for transmission of a CQI. The PUCCH formats 2a/2b are used for simultaneous transmission of the CQI and the ACK/NACK signal. When only the ACK/NACK signal is transmitted in a subframe, the PUCCH formats 1a/1b are used. When the SR is transmitted alone, the PUCCH format 1 is used. When the SR and the ACK/NACK are simultaneously transmitted, the PUCCH format 1 is used, and in this transmission, the ACK/NACK signal is modulated by using a resource allocated to the SR.

All PUCCH formats use a cyclic shift (CS) of a sequence in each OFDM symbol. A cyclically-shifted sequence is generated by cyclically shifting a base sequence by a specific CS amount. The specific CS amount is indicated by a CS index.

An example of a base sequence $r_u(n)$ is defined by Equation 1 below.

$$r_u(n) = e^{jb(n)\pi/4} \quad \text{[Equation 1]}$$

In Equation 1, u denotes a root index, and n denotes a component index in the range of $0 \leq n \leq N-1$, where N is a length of the base sequence. b(n) is defined in the section 5.5 of 3GPP TS 36.211 V8.7.0.

The length of the sequence is equal to the number of elements included in the sequence. u can be determined by a cell identifier (ID), a slot number in a radio frame, etc. When it is assumed that the base sequence is mapped to one RB in a frequency domain, the length N of the base sequence is 12 since one RB includes 12 subcarriers. A different base sequence is defined according to a different root index.

The base sequence r(n) can be cyclically shifted by Equation 2 below to generate a cyclically-shifted sequence $r(n, I_{cs})$.

$$r(n, I_{cs}) = r(n) \cdot \exp\left(\frac{j2\pi I_{cs} n}{N}\right), \quad \text{[Equation 2]}$$
$$0 \leq I_{cs} \leq N - 1$$

In Equation 2, $I_{cs}$ denotes a CS index indicating a CS amount ($0 \leq I_{cs} \leq N-1$).

An available CS index of the base sequence denotes a CS index that can be derived from the base sequence according to a CS interval. For example, if the base sequence has a length of 12 and the CS interval is 1, the total number of available CS indices of the base sequence is 12. Alternatively, if the base sequence has a length of 12 and the CS interval is 6, the total number of available CS indices of the base sequence is 6.

Now, CQI transmission in the PUCCH format 2 will be described.

Hereinafter, a CQI is only one example of a UL control signal transmitted using the PUCCH format 2. The CQI can include a wideband CQI, a subband CQI, a precoding matrix indication (PMI) indicating an index of a precoding matrix, and/or rank indication (RI) indicating a rank.

Figure 6:
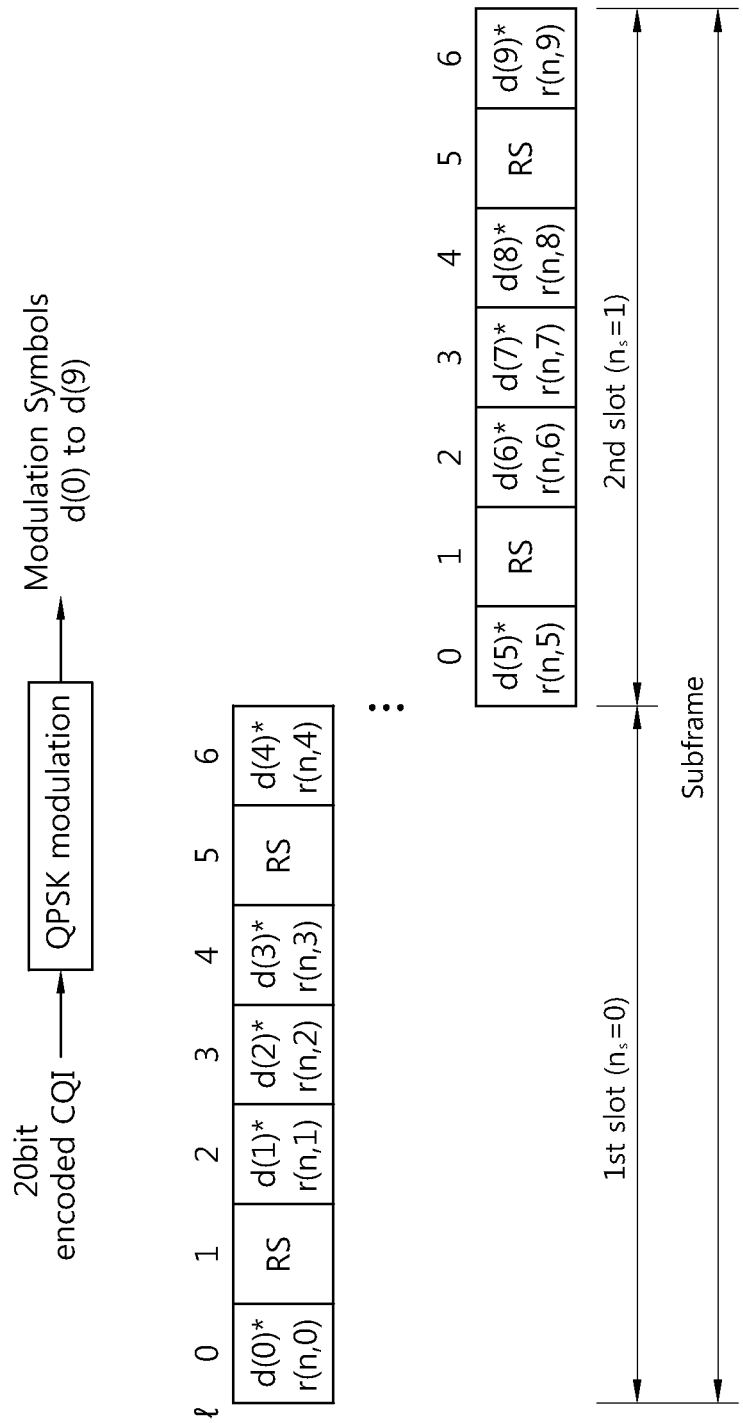
FIG. 6 shows a physical uplink control channel (PUCCH) format 2 in case of a normal cyclic prefix (CP) in 3GPP LTE.
Figure 7:
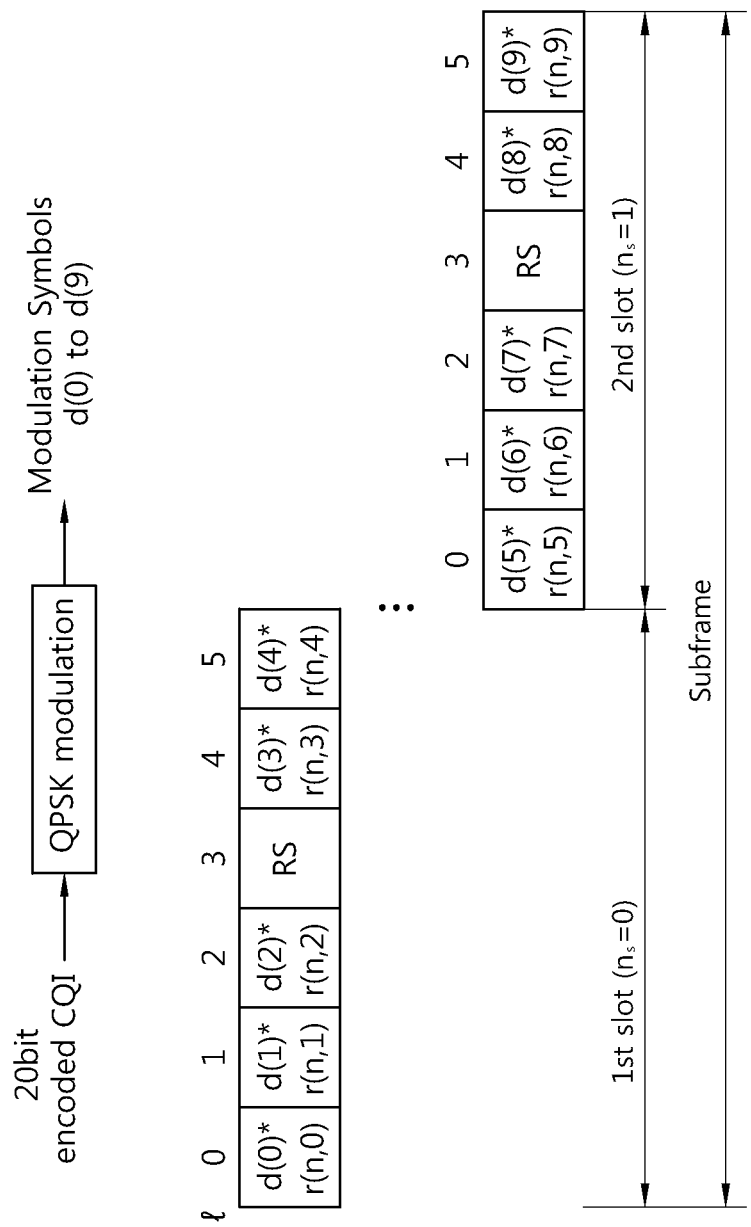
FIG. 7 shows a PUCCH format 2 in case of an extended CP in 3GPP LTE.

FIG. 6 shows a PUCCH format 2 in case of a normal CP in 3GPP LTE. FIG. 7 shows a PUCCH format 2 in case of an extended CP in 3GPP LTE. The number of OFDM symbols included per slot is different between the normal CP and the extended CP, and thus a location of a reference signal (RS) and the number of RSs are different. However, a CQI structure is the same.

Channel coding is performed on a CQI payload to generate an encoded CQI. In 3GPP LTE, a payload of the PUCCH format 2 is up to 13 bits, and a 20-bit encoded CQI is generated always irrespective of a size of a payload in use.

From the 20-bit encoded CQI, 10 modulation symbols d(0), . . . , d(9) are generated by using quadrature phase shift keying (QPSK) modulation. Since one slot has five OFDM symbols for CQI transmission in the normal CP or the extended CP, one subframe has 10 OFDM symbols for CQI transmission. Therefore, 10 modulation symbols are generated such that one modulation symbol corresponds to one OFDM symbol.

The modulation symbol corresponding to each OFDM symbol is spread to a cyclically-shifted sequence $r(n,I_{cs})$. When a spread sequence corresponding to an $(i+1)^{th}$ OFDM symbol in a subframe is denoted by s(i), it can be expressed as follows.

$$\{s(0),s(1),\ldots,s(9)\}=\{d(0)r(n,I_{cs}),d(1)r(n,I_{cs}),\ldots,d(9)r(n,I_{cs})\}$$

A CS index $I_{cs}$ can vary depending on a slot number $n_s$ in a radio frame and/or a symbol index l in a slot. When a $1^{st}$ CS index is set to 0 and a CS index value is increased by one in each OFDM symbol, as shown in FIG. 6 and FIG. 7, it can be expressed as follows.

$$\{s(0),s(1),\ldots,s(9)\}=\{d(0)r(n,0),d(1)r(n,1),\ldots,d(9)r(n,9)\}$$

Spread sequences $\{s(0), s(1), \ldots, s(9)\}$ are subjected to IFFT by using corresponding resource blocks, and then are transmitted by using corresponding resource blocks. Accordingly, the CQI is transmitted on a PUCCH.

In the PUCCH of 3GPP LTE, a BS identifies the PUCCH received from each UE by using different CS and/or orthogonal sequences in identical or different resource blocks. For example, a $1^{st}$ UE transmits a CQI on the basis of a first cyclically-shifted sequence, and a $2^{nd}$ UE transmits a CQI on the basis of a second cyclically-shifted sequence. Thus, the PUCCH of a plurality of UEs is multiplexed in the same resource block. If the number of available CSs is 12, 12 UEs can be multiplexed to one resource block.

The UE has to know a CS index $I_{cs}$ and an RB index m to constitute the PUCCH format 2. In 3GPP LTE, the BS reports one resource index $n_{PUCCH}^{(2)}$ to the UE, and the UE acquires the CS index $I_{cs}$ and the RB index m on the basis of a resource index $n_{PUCCH}^{(2)}$.

In 3GPP LTE, PUCCH formats 2a/2b are defined to transmit an additional ACK/NACK signal on the basis of the PUCCH structure shown in FIG. 6 and FIG. 7. The PUCCH format 2a uses BPSK modulation, and the PUCCH format 2b uses QPSK modulation.

Figure 8:
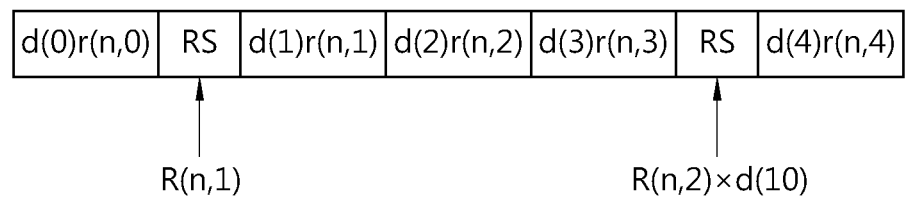
FIG. 8 shows a structure of a PUCCH format 2a in a normal CP.

FIG. 8 shows a structure of a PUCCH format 2a in a normal CP.

It is assumed that 10 modulation symbols d(0) to d(9) exist for a CQI, and d(10) denotes one modulation symbol generated by using BPSK modulation on an ACK/NACK signal. The modulation symbol d(10) is generated by using BPSK modulation in the PUCCH format 2a, and is generated by using QPSK modulation in a PUCCH format 2b.

In the normal CP, two OFDM symbols exist for a reference signal (RS), and such symbols are called RS OFDM symbols. RS sequences corresponding to two RS OFDM symbols are respectively denoted by R(n,1) and R(n,2).

The RS sequence is a cyclically-shifted sequence generated by cyclically shifting the base sequence r(n). A CS amount for the RS is determined based on a resource index $n_{PUCCh}^{(2)}$.

The aforementioned modulation symbol d(10) is spread by the second RS sequence R(n,2), and is transmitted in a second RS OFDM symbol.

A receiver can calculate a phase difference between first and second RS sequences to detect an ACK/NACK signal.

As described above, a maximum payload of a PUCCH in a 3GPP LTE system is 22 bits (i.e., CQI 20 bits+ACK/NACK 2 bits) of the PUCCH format 2b.

However, the introduction of more advanced techniques such as cooperative multiple point transmission and reception (CoMP), carrier aggregation, uplink MU-MIMO, etc., results in the increase in uplink control signals, and thus a payload of the conventional PUCCH structure may not be enough.

Now, a method of increasing a payload by using the conventional PUCCH structure while maintaining a low PAPR/CM property will be described.

It is assumed hereinafter that two PUCCH resources are allocated to a UE. As described above, the PUCCH formats 2/2a/2b are identified by an RB index m and a CS index $I_{cs}$. Allocating of two PUCCH resources to the UE implies that two resource indices, two RB indices and/or two CS indices are allocated to configure two PUCCHs.

The two PUCCH resources can be allocated by using various methods.

First, a BS reports a resource index $n_{PUCCH}^{(2)}$ to a UE. The UE can obtain a first PUCCH resource from a resource index $n_{PUCCH}^{(2)}$, and can obtain a second PUCCH resource from an offset of the resource index $n_{PUCCH}^{(2)}$. The offset can be reported by the BS to the UE, or can be predetermined.

Second, a BS reports two resource indices to a UE. The UE can obtain a first PUCCH resource from a first resource index, and can obtain a second PUCCH resource from a second resource index.

The two PUCCH resources are for exemplary purposes only, and thus those ordinary skilled in the art can easily apply the technical features of the present invention to a case where two or more PUCCH resources are allocated.

Hereinafter, a method of extending a payload on the basis of the PUCCH formats 2a/2b by using two PUCCH resources will be described. For clarity of explanation, the following description will focus on a slot structure in a normal CP.

Figure 9:
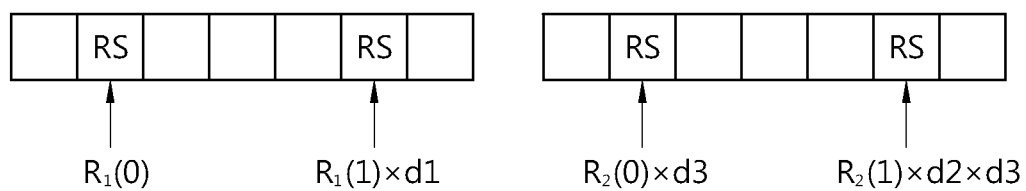
FIG. 9 shows an extended PUCCH structure according to an embodiment of the present invention.

FIG. 9 shows an extended PUCCH structure according to an embodiment of the present invention. Two PUCCHs are identified by two CS indices. The two PUCCHs can use identical RBs (i.e., identical subcarriers) or can use different RBs.

A first PUCCH is used in transmission of a first CQI. $R_1(0)$ and $R_1(1)$ are first cyclically-shifted RS sequences generated based on a first CS index (or a first resource index).

A second PUCCH is used in transmission of a second CQI. $R_2(0)$ and $R_2(1)$ are second cyclically-shifted RS sequences generated based on a second CS index (or a second resource index).

Since a cyclic shift ensures orthogonality, a phase can be easily detected, and a UE can identify the two PUCCH channels in the same RB.

Symbols d1, d2, and d3 denote UL control signals transmitted using an extended payload. For example, a 6-bit (encoded or non-encoded) ACK/NACK signal is assumed. For encoding of the ACK/NACK signal, well-known schemes such as single parity check (SPC) or repetition coding can be used. By using QPSK modulation on the 6-bit ACK/NACK signal, the three complex-valued symbols d1, d2, and d3 can be generated. Alternatively, the symbols d1, d2, and d3 may be symbols for representing the ACK/NACK signal by using a phase difference of cyclically-shifted sequences.

The symbols d1, d2, and d3 are spread by first and second cyclically-shifted RS sequences.

More specifically, it is assumed that the symbols d1, d2, and d3 represent the ACK/NACK signal by changing a phase difference of the RS sequences. It is also assumed that a sequence $R_1(1)$ is multiplied by d1, a sequence $R_2(0)$ is multiplied by d3, and a sequence $R_2(1)$ is multiplied by d2 and d3. If two PUCCHs use the same RB, only one RS sequence can be used as an RS.

A BS can detect the ACK/NACK signal as follows. First, d1 is detected by using a phase difference between $R_1(0)$ and $d1*R_1(1)$. d2 is detected by using a phase difference between $d3*R_2(0)$ and $d2*d3*R_2(1)$. d3 is detected by using a phase difference between $R_1(0)$ and $d3*R_2(0)$.

Therefore, the BS can obtain all of the symbols d1, d2, and d3, and can receive the ACK/NACK signal.

Figure 10:
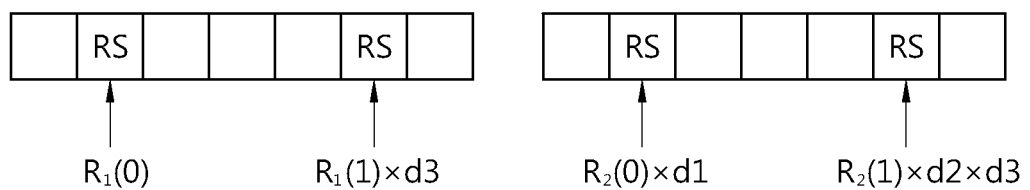
FIG. 10 shows an extended PUCCH structure according to another embodiment of the present invention.

FIG. 10 shows an extended PUCCH structure according to another embodiment of the present invention. In comparison with the example of FIG. 9, it shows that positions of RS OFDM symbols mapped to symbols d1, d2, and d3 or an extended RS sequence can change.

A sequence $R_1(1)$ is multiplied by d3, a sequence $R_2(0)$ is multiplied by d1, and a sequence $R_2(1)$ is multiplied by d2 and d3. That is, it can be said that d3 is spread by $R_1(1)$, d1 is spread by $R_2(0)$, and d2 and d3 are spread by $R_2(1)$.

The BS can detect the ACK/NACK signal as follows. First, d1 is detected by using a phase difference between $R_1(0)$ and $d1*R_2(0)$. d2 is detected by using a phase difference between $d3*R_1(1)$ and $d2*d3*R_2(1)$. d3 is detected by using a phase difference between $R_1(0)$ and $d3*R_1(1)$.

A phase difference between RSs is used to transmit the ACK/NACK signal to be multiplexed. Under the situation where a channel between a first RS OFDM symbol and a second RS OFDM symbol can change due to a rapid change in a UE speed, d1 and d2 can be detected with better performance than that of FIG. 9. If d3 is generated by using SPC, it may facilitate the detection of d1 and d2, and thus d1 and d2 can be detected with higher accuracy.

Figure 11:
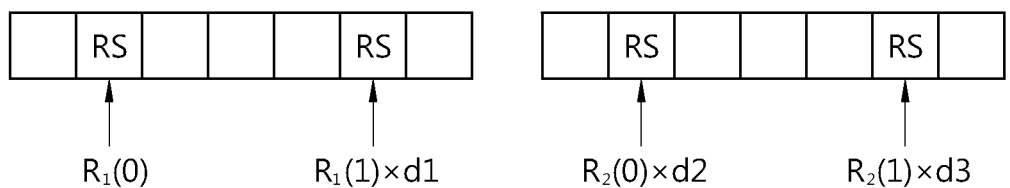
FIG. 11 shows an extended PUCCH structure according to another embodiment of the present invention.

FIG. 11 shows an extended PUCCH structure according to another embodiment of the present invention. In comparison with the example of FIG. 9, it shows that each of symbols d1, d2, and d3 can be spread by one RS OFDM symbol or one RS sequence.

A sequence $R_1(1)$ is multiplied by d1, a sequence $R_2(0)$ is multiplied by d2, and a sequence $R_2(1)$ is multiplied by d3. That is, d1 is spread by $R_1(1)$, d2 is spread by $R_2(0)$, and d3 is spread by $R_2(1)$.

A BS can detect an ACK/NACK signal as follows. First, d1 is detected by using a phase difference between $R_1(0)$ and $d1*R_1(1)$. d2 is detected by using a phase difference between $R_1(0)$ and $d2*R_2(0)$. d3 is detected by using a phase difference between $R_1(0)$ and $d3*R_2(1)$.

Figure 12:
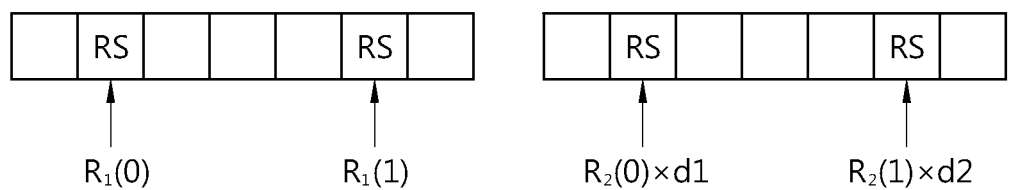
FIG. 12 shows an extended PUCCH structure according to another embodiment of the present invention.

FIG. 12 shows an extended PUCCH structure according to another embodiment of the present invention. This is a case where an ACK/NACK signal is represented by two symbols d1 and d2.

d1 is spread by $R_2(0)$, and d2 is spread by $R_2(1)$. Since RS OFDM symbols located in the same position experience the same channel, detection performance can be increased by multiplexing d1 and d2 to either a first PUCCH or a second PUCCH.

Alternatively, d1 and d2 can be multiplexed to different PUCCHs. For example, d1 is spread by $R_1(1)$, and d2 is spread by $R_2(1)$.

The aforementioned embodiments of FIG. 9 to FIG. 12 show a case of considering only one slot. As well-known, since a PUCCH uses two slots in pair, the aforementioned extended PUCCH can be more variously modified when considering the two slots.

Figure 13:
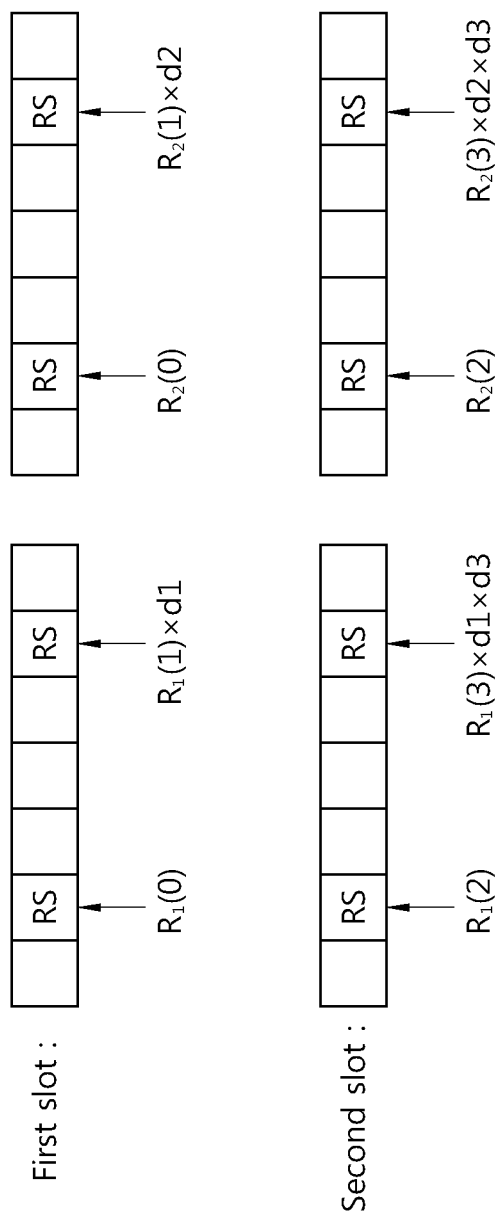
FIG. 13 shows an extended PUCCH structure according to another embodiment of the present invention.

FIG. 13 shows an extended PUCCH structure according to another embodiment of the present invention.

A first PUCCH is used in transmission of a first CQI. $R_1(0)$, $R_1(1)$, $R_1(2)$, and $R_1(3)$ used in modulation of the first CQI are first cyclically-shifted RS sequences generated on the basis of a first CS index (or a first resource index).

A second PUCCH is used in transmission of a second CQI. $R_2(0)$, $R_2(1)$, $R_2(2)$, and $R_2(3)$ used in modulation of the second CQI are second cyclically-shifted RS sequences generated based on a second CS index (or a second resource index).

When there are three symbols d1, d2, and d3 for an ACK/NACK signal, each symbol can be spread by at least one of first cyclically-shifted RS sequences or at least one second cyclically-shifted RS sequences.

For example, it is assumed that a sequence $R_1(1)$ is multiplied by d1, a sequence $R_1(3)$ is multiplied by d1 and d3, a sequence $R_2(1)$ is multiplied by d1, and a sequence $R_2(3)$ is multiplied by d2 and d3.

A BS can detect the two symbols d1 and d2 by detecting a phase difference in a first slot, and then can detect the symbol d3.

Positions of first and second RS sequences for spreading the symbols d1, d2, and d3 or a position of an RS OFDM symbol are for exemplary purposes only.

The aforementioned embodiments of FIG. 9 to FIG. 13 can also apply to different RBs. However, it may be necessary to consider that even if RS OFDM symbols are located in the same position, the symbols can experience different channels in signal detection. For example, in the example of FIG. 9, if an RB of a first PUCCH is different from an RB of a second PUCCH, an error may occur when the conventional detection scheme is used to detect the symbol d3. In this case, a CQI decoding process can be performed by using a log likelihood ratio (LLR) for the number of cases allowed to the symbol d3 (e.g., in case of QPSK, 4 phases), that is, a probability value. Then, the symbol d3 can be determined by using a changed LLR value of the symbol d3 after performing decoding.

Figure 14:
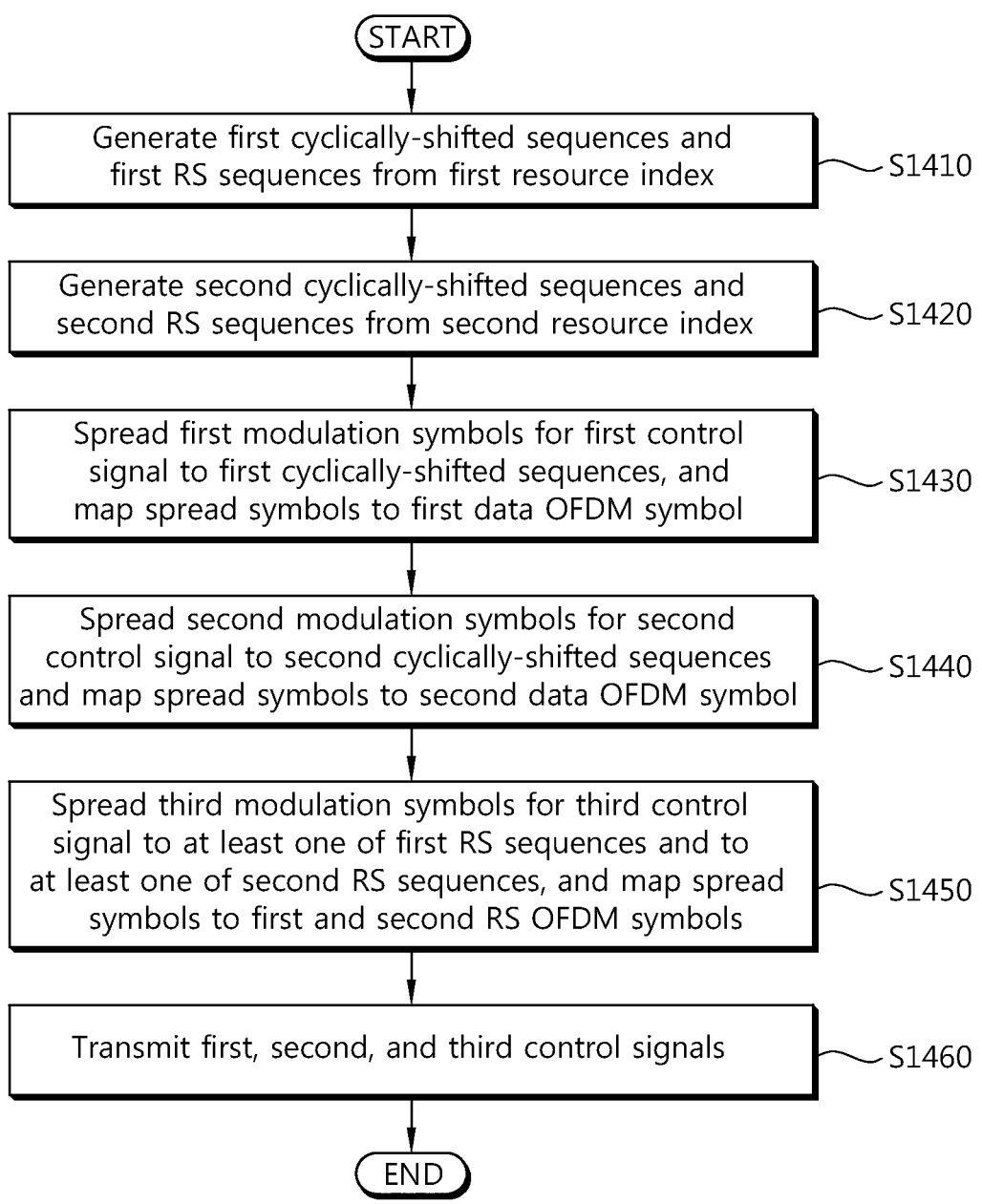
FIG. 14 is a flowchart showing a method of transmitting an uplink control signal according to an embodiment of the present invention.

FIG. 14 is a flowchart showing a method of transmitting a UL control signal according to an embodiment of the present invention.

A UE generates a plurality of first cyclically-shifted sequences and a plurality of first RS sequences from a first resource index (step S1410). The first cyclically-shifted sequences and the first RS sequences are generated by being cyclically shifted by a CS amount from a base sequence.

The UE generates a plurality of second cyclically-shifted sequences and a plurality of second RS sequences from a second resource index (step S1420). The second cyclically-shifted sequences and the second RS sequences are generated by being cyclically shifted by the CS amount from the base sequence.

The UE can receive information on first and second resource indices from a BS, or can obtain the second resource index on the basis of the first resource index.

The UE generates first modulation symbols by modulating a first control signal, spreads the first modulation symbols to the first cyclically-shifted sequences, and maps the spread sequences to first data OFDM symbols (step S1430). The first control signal is a UL control signal transmitted through a first PUCCH.

The UE generates second modulation symbols by modulating a second control signal, spreads the second modulation symbols to the second cyclically-shifted sequences, and maps the spread sequences to second data OFDM symbols (step S1440). The second control signal is a UL control signal transmitted through a second PUCCH.

The UE spreads third modulation symbols for a third control signal to at least one of the plurality of first RS sequences and/or at least one of the plurality of second RS sequences, and maps the spread signals to first and second RS OFDM symbols (step S1450). The third control signal is a UL control signal transmitted by being multiplexed to an RS of the first and second PUCCHs. The aforementioned embodiments of FIG. 9 to FIG. 13 show various multiplexing schemes.

The UE transmits the first, second, and third control signals (step S1460).

A low PAPR/CM property can be maintained by utilizing the conventional PUCCH structure, and a payload size of a PUCCH can increase.

Figure 15:
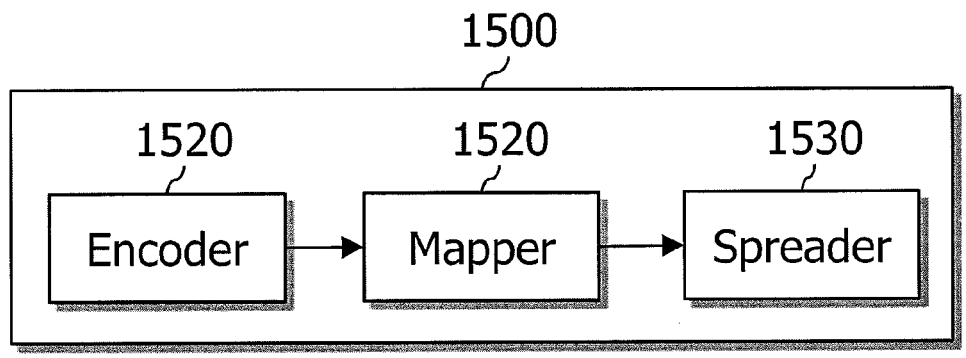
FIG. 15 is a block diagram showing a transmitter according to an embodiment of the present invention.

FIG. 15 is a block diagram showing a transmitter according to an embodiment of the present invention. The aforementioned embodiments of FIG. 9 to FIG. 14 can be implemented by a transmitter 1500.

The transmitter 1500 includes an encoder 1510, a mapper 1520, and a spreader 1530. The encoder 1510 encodes a control signal to output an encoded control signal. The mapper 1520 modulates the encoded control signal to generate modulation symbols. There is no restriction on a modulation scheme, and the modulation scheme may be BPSK, QPSK, or a higher-order modulation scheme.

The spreader 1530 generates spread sequences, and spreads the modulation symbols by using the spread sequences. The spread sequences are the cyclically-shifted sequences and/or RS sequences shown in FIG. 14. The spreader 1530 can spread the modulation symbols by using the spread sequences generated from a plurality of PUCCHs, and can map the symbols to data OFDM symbols or RS OFDM symbols.

Figure 16:
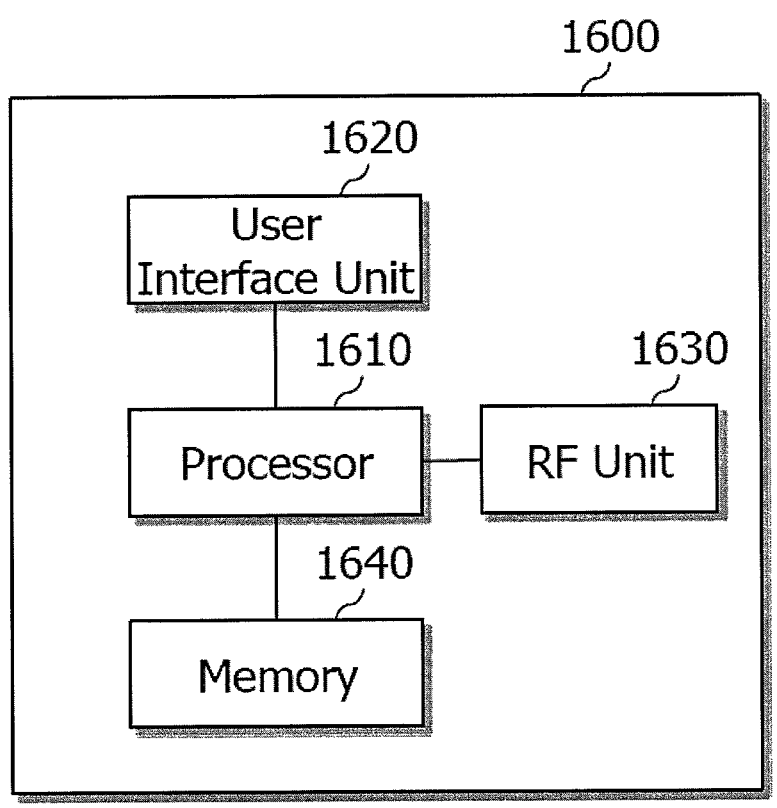
FIG. 16 is a block diagram showing a user equipment according to an embodiment of the present invention.

FIG. 16 is a block diagram showing a UE according to an embodiment of the present invention. The transmitter 1500 may be a part of a UE 1600.

The UE 1600 includes a processor 1610, a user interface unit 1620, a radio frequency (RF) unit, and a memory 1640.

The processor 1610 implements the embodiments of FIG. 9 to FIG. 14. The encoder 1510, the mapper 1520, and the spreader 1530 of the transmitter 1500 can be implemented by the processor 1610.

The user interface unit 1620 provides a user interface. The RF unit 1630 coupled to the processor 1610 transmits and/or receives a radio signal. The memory 1640 coupled to the processor 1610 stores a variety of information for driving the processor 1610.

The processor may include an application-specific integrated circuit (ASIC), a separate chipset, a logic circuit, a data processing unit, and/or a converter that performs signal conversion between a baseband signal and a radio signal. The memory may include a read-only memory (ROM), a random access memory (RAM), a flash memory, a memory card, a storage medium, and/or other equivalent storage devices. When the embodiment of the present invention is implemented in software, the aforementioned methods can be implemented with a module (i.e., process, function, etc.) for performing the aforementioned functions. The module may be stored in the memory and may be performed by the processor.

The invention claimed is:

1. A method of transmitting an uplink control signal in a wireless communication system, the method comprising:
generating a plurality of first data orthogonal frequency division multiplexing (OFDM) symbols based on a first control signal;
generating a plurality of first reference signal (RS) OFDM symbols based on a plurality of first RS sequences;
generating a plurality of second data OFDM symbols based on a second control signal;
generating a plurality of second RS OFDM symbols based on a plurality of second RS sequences;
generating a plurality of third modulation symbols by modulating a third control signal; and
transmitting the first, second, and third control signals in a first slot and a second slot,
wherein the first slot includes the plurality of first data OFDM symbols and the plurality of first RS OFDM symbols, and the second slot includes the plurality of second data OFDM symbols and the plurality of second RS OFDM symbols,
wherein the plurality of third modulation symbols are spread to at least one of the plurality of first RS sequences and to at least one of the plurality of second RS sequences, and
wherein if the plurality of third modulation symbols are expressed as d1, d2 and d3, if the plurality of first RS sequences are expressed as $R_1(0)$ and $R_1(1)$, and if the plurality of second RS sequences are expressed as $R_2(0)$ and $R_2(1)$, then the $R_1(1)$ is multiplied by the d1, the $R_2(0)$ is multiplied by the d3 and the $R_2(1)$ is multiplied by the product of the d2 and d3.

2. The method of claim 1, wherein the first slot and the second slot use identical subcarriers.

3. The method of claim 2, further comprising:
receiving information on the first resource index from a base station.

4. The method of claim 3, further comprising:
receiving information on the second resource index from the base station.

5. The method of claim 1, wherein the first slot and the second slot use different subcarriers.

6. The method of claim 1, wherein the generating the plurality of first data OFDM symbols includes:
generating a plurality of first modulation symbols by modulating the first control signal;
generating a plurality of first cyclically-shifted sequences by cyclically shifting a base sequence by cyclic shift values derived from a first resource index;
generating a plurality of first spread sequences by spreading the plurality of first modulation symbols respectively to the plurality of first cyclically-shifted sequences; and
mapping the plurality of first spread sequences respectively to the plurality of first data OFDM symbols;
wherein the generating the plurality of first RS OFDM symbols includes:
generating the plurality of first reference signal (RS) sequences for an RS used to demodulate the first control signal on the basis of the first resource index; and
mapping the plurality of first RS sequences respectively to the plurality of first RS OFDM symbols;
wherein the generating the plurality of second data OFDM symbols includes:
generating a plurality of second modulation symbols by modulating the second control signal;
generating a plurality of second cyclically-shifted sequences by cyclically shifting a base sequence by cyclic shift values derived from a second resource index;
generating a plurality of second spread sequences by spreading the plurality of second modulation symbols respectively to the plurality of second cyclically-shifted sequences; and
mapping the plurality of second spread sequences respectively to the plurality of second data OFDM symbols; and
wherein the generating the plurality of second RS OFDM symbols includes:

generating the plurality of second RS sequences for an RS used to demodulate the second control signal on the basis of the second resource index; and mapping the plurality of second RS sequences respectively to the plurality of second RS OFDM symbols.

7. The method of claim 3, wherein the second resource index is defined from an offset of the first resource index.

8. The method of claim 1, wherein the first and second control signals are channel quality indicators (CQIs), and the third control signal is a positive-acknowledgement (ACK)/negative-acknowledgement (NACK) signal.

9. A user equipment comprising:
a radio frequency (RF) unit for transmitting and receiving a radio signal; and
a processor coupled to the RF unit,
wherein the processor is configured for:
generating a plurality of first data orthogonal frequency division multiplexing (OFDM) symbols based on a first control signal;
generating a plurality of first reference signal (RS) OFDM symbols based on a plurality of first RS sequences;
generating a plurality of second data OFDM symbols based on a second control signal;
generating a plurality of second RS OFDM symbols based on a plurality of second RS sequences;
generating a plurality of third modulation symbols by modulating a third control signal; and
transmitting the first, second, and third control signals in a first slot and a second slot,
wherein the first slot includes the plurality of first data OFDM symbols and the plurality of first RS OFDM symbols, and the second slot includes the plurality of second data OFDM symbols and the plurality of second RS OFDM symbols,
wherein the plurality of third modulation symbols are spread to at least one of the plurality of first RS sequences and to at least one of the plurality of second RS sequences, and
wherein if the plurality of third modulation symbols are expressed as d1, d2 and d3, if the plurality of first RS sequences are expressed as $R_1(0)$ and $R_1(1)$, and if the plurality of second RS sequences are expressed as $R_2(0)$ and $R_2(1)$, then the $R_1(1)$ is multiplied by the d1, the $R_2(0)$ is multiplied by the d3 and the $R_2(1)$ is multiplied by the product of the d2 and the d3.

10. The user equipment of claim 9, wherein the generating the plurality of first data OFDM symbols includes:
generating a plurality of first modulation symbols by modulating the first control signal;
generating a plurality of first cyclically-shifted sequences by cyclically shifting a base sequence by cyclic shift values derived from a first resource index;
generating a plurality of first spread sequences by spreading the plurality of first modulation symbols respectively to the plurality of first cyclically-shifted sequences; and
mapping the plurality of first spread sequences respectively to the plurality of first data OFDM symbols;
wherein the generating the plurality of first RS OFDM symbols includes:
generating the plurality of first reference signal (RS) sequences for an RS used to demodulate the first control signal on the basis of the first resource index; and
mapping the plurality of first RS sequences respectively to the plurality of first RS OFDM symbols;
wherein the generating the plurality of second data OFDM symbols includes:
generating a plurality of second modulation symbols by modulating the second control signal;
generating a plurality of second cyclically-shifted sequences by cyclically shifting a base sequence by cyclic shift values derived from a second resource index;
generating a plurality of second spread sequences by spreading the plurality of second modulation symbols respectively to the plurality of second cyclically-shifted sequences; and
mapping the plurality of second spread sequences respectively to the plurality of second data OFDM symbols; and
wherein the generating the plurality of second RS OFDM symbols includes:
generating the plurality of second RS sequences for an RS used to demodulate the second control signal on the basis of the second resource index; and
mapping the plurality of second RS sequences respectively to the plurality of second RS OFDM symbols.

11. The user equipment of claim 10, wherein the first slot and the second slot use identical subcarriers.

12. The user equipment of claim 10, wherein the first slot and the second slot use different subcarriers.

* * * * *